United States Patent [19]

Fortier

[11] Patent Number: 5,497,487
[45] Date of Patent: Mar. 5, 1996

[54] MERGE, COMMIT RECOVERY PROTOCOL FOR REAL-TIME DATABASE MANAGEMENT SYSTEMS

[75] Inventor: Paul J. Fortier, Portsmouth, R.I.

[73] Assignee: The United States of America as represented by the Secretary of the Navy, Washington, D.C.

[21] Appl. No.: 236,900

[22] Filed: Apr. 28, 1994

[51] Int. Cl.$^6$ .................................................. G06F 17/30
[52] U.S. Cl. ..................... 395/600; 395/650; 395/726; 364/974; 364/962.1; 364/281.4; 364/281.5; 364/282.1; 364/285.1; 364/DIG. 1
[58] Field of Search ................................. 395/600, 726, 395/650

[56] References Cited

U.S. PATENT DOCUMENTS

| | | | |
|---|---|---|---|
| 4,507,751 | 3/1985 | Gawlick et al. | 395/575 |
| 4,881,166 | 11/1989 | Thompson et al. | 395/600 |
| 5,151,987 | 9/1992 | Abraham et al. | 395/575 |
| 5,193,188 | 3/1993 | Franaszek et al. | 395/650 |
| 5,201,044 | 4/1993 | Freynk et al. | 395/575 |
| 5,241,675 | 8/1993 | Sheth et al. | 395/600 |
| 5,263,156 | 11/1993 | Bowen et al. | 395/600 |
| 5,280,619 | 1/1994 | Wang | 395/725 |
| 5,329,626 | 7/1994 | Klein et al. | 395/375 |
| 5,438,680 | 8/1995 | Sullivan | 395/800 |

OTHER PUBLICATIONS

Clamen et al., "Reliable Distributed Computing with Avalon/Common LISP", *1990 International Conference on Computer Languages*, New Orleans, La., 12–15 Mar. 1990, pp. 169–179.

P. S. Barth, "Using Atomic Data Structures for Parallel Simulation", *Proceedings: Scalable High Performance Computing Conference*, Williamsburg, Va., 26–29 Apr. 1992, pp. 30–37.

Fortier, Paul J., "Early Commit," University of Massachusetts, Lowell, MA, Apr. 28, 1993, pp. 1–29, 46–71.

*Primary Examiner*—Thomas G. Black
*Assistant Examiner*—Paul R. Lintz
*Attorney, Agent, or Firm*—Michael J. McGowan; James M. Kasischke; Prithvi C. Lall

[57] ABSTRACT

A computer database method using data organized data into atomic data sets and transactions separated into a plurality of statements called projections which operate on only one said atomic data set. Statements such as read commands, write commands, assignment commands, transaction delimiting commands, and projection delimiting commands are executed, and a depends on graph is created during execution of the statements. Projection recovery data is stored during operation. When a statement requests commit the depends on graph is analyzed to determine if the projection is related to another projection in the transaction. The projection is committed if it is not related to another projection and delayed if related to another projection. Likewise, the system determines related projections and aborts them together if a transaction error occurs. The method can recover to a consistent database state after projection abortion.

5 Claims, 5 Drawing Sheets

GIVEN: ADS A CONTAINS {a, b, c} AND ADS B CONTAINS {d, e,}

```
        Tbegin
    S1:     sb(A)              /* CREATE LINK TO πA */
    S2:     v1 := r(a)          /* S3 ∈ πA */
    S3:     v2 := r(b)          /* S4 ∈ πA */
    S4:     v3 := fi(v1,v2)     /* S4 DIRECTLY DEPENDS ON S2 AND S3 */
    S5:     w(c,v3)             /* S5 ∈ πA AND S5 DEPENDS ON S4 */
    S6:     sb(B)               /* CREATE LINK TO πB */
    S7:     v4 := r(d)          /* S7 ∈ πB */
    S8:     v4 := fj(v4,v3)     /* S8 DEPENDS ON S7, S2 AND S3 */
    S9:     sc(A)               /* PREPARE TO COMMIT πA */
    S10:    w(e,v4)             /* S10 ∈ πB AND S10 DEPENDS ON S7, S2 AND S3 */
    S11:    sc(B)
        Tend
```

GIVEN: ADS A CONTAINS {a, b, c} AND ADS B CONTAINS {d, e,}

Tbegin $S_1$:     sb(A)            /* CREATE LINK TO $\pi_A$ */
$S_2$:     $v_1 := r(a)$    /* $S_3 \in \pi_A$ */
$S_3$:     $v_2 := r(b)$    /* $S_4 \in \pi_A$ */
$S_4$:     $v_3 := f_i(v_1, v_2)$  /* $S_4$ DIRECTLY DEPENDS ON $S_2$ AND $S_3$ */
$S_5$:     $w(c, v_3)$      /* $S_5 \in \pi_A$ AND $S_5$ DEPENDS ON $S_4$ */
$S_6$:     sb(B)            /* CREATE LINK TO $\pi_B$ */
$S_7$:     $v_4 := r(d)$    /* $S_7 \in \pi_B$ */
$S_8$:     $v_4 := f_j(v_4, v_3)$  /* $S_8$ DEPENDS ON $S_7$, $S_2$ AND $S_3$ */
$S_9$:     sc(A)            /* PREPARE TO COMMIT $\pi_A$ */
$S_{10}$:  $w(e, v_4)$      /* $S_{10} \in \pi_B$ AND $S_{10}$ DEPENDS ON $S_7$, $S_2$ AND $S_3$ */
$S_{11}$:  sc(B)

Tend

| INIT. P.C. | INDEX | ACTIVE VAR. | ACTIVE PROJ. | DEFINED VAR. |
|---|---|---|---|---|
| $\pi_A(PC)$ | A | ∅ | ∅ | $V_1, V_2, V_3$ |
| $\pi_B(PC)$ | B | $V_1, V_2, V_3$ | $\pi_A$ | $V_4$ |
| | | | | |

MERGE, COMMIT RECOVERY PROTOCOL FOR REAL-TIME DATABASE MANAGEMENT SYSTEMS

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED PATENT APPLICATIONS

This patent application is co-pending with four related patent applications entitled Early Commit Locking Computer Database Protocol, N.C. 75962; Early Commit Timestamp Computer Database Protocol, N.C. 76259; Early Commit Optimistic Computer Database Protocol, N.C. 76260; and Replay Recovery Protocol for Real-time Database Management Systems, N.C. 75806 all by the same inventor and filed on the same date as subject patent application.

BACKGROUND OF THE INVENTION (1) Field of the Invention

The present invention relates to real-time database systems and more particularly to a real-time method for recording data in a database which maintains database consistency in the event of a system failure.

(2) Description of the Prior Art

It is well known that database systems fail for a variety of reasons. The computer hardware can fail, the storage media can fail, or the transaction processing software can fail. System failures cause loss of volatile main memory storage, transaction failures cause an abnormal termination of a transaction, and media failures cause a loss of secondary nonvolatile storage.

Failure recovery must ensure that the database remains consistent after one of these failures. Redundant media storage and shadowing the database across the redundant media allows recovery if one set of the media fails. Shadowing the data requires changes to be written to both copies of the database without interruption. On failure, the shadow database becomes the primary database, and the database system can continue to operate. Of more interest are system and transaction errors because these errors are expected more frequently, and recovery from these errors must be efficiently supported. A typical transaction error called "deadlock" occurs when two transactions are waiting on each other to complete usage of a particular data set, and each transaction has locked the data needed by the other. The usual solution to this error is to abort one of the two conflicting transactions and then restart the transaction.

When a hardware or power failure occurs, information contained in primary memory such as random access memory (RAM) is considered lost. With this type of failure, transactions are left in one of two states; those committed before the failure, and those active but not committed before the failure. Committed transactions are those transactions which have been copied from the primary memory to a stable computer database media such as a magnetic disk, optical disk, or magnetic tape. Recovery must ensure that committed transactions remain committed and active transactions do not cause database inconsistencies upon reactivation.

Conventional means for recovery of committed and active transactions use non-volatile checkpointing to mark data items which have been committed. Upon recovery from the system error, check pointed transactions are completed to make permanent the changes specified by those transactions. Any database changes made by the uncommitted transactions are restored to the state which existed before the transaction was performed. Undone transactions can be restarted at some later time. Some disadvantages of this system are that it requires the maintenance of a log for all database operations for use in restoring a database in some previous state. During recovery, the system applies the log to the entire transaction requiring the entire transaction to be undone or redone, and during recovery the database is unavailable for use.

SUMMARY OF THE INVENTION

Accordingly, it is a general purpose and object of the present invention to provide a real-time database system that maintains database consistency and correctness when a failure occurs.

It is a further object that such database system provide recovery from system and transaction failures in a timely manner.

These objects are accomplished with the present invention by providing a computer database method using data organized into atomic data sets and transactions separated into projections having statements which operate on only one atomic data set. Statements such as read commands, write commands, assignment commands, transaction delimiting commands, and projection delimiting commands are executed, and a depends on graph is created during execution of the statements. Projection recovery data is stored during operation. When a statement requests commit, the depends on graph is analyzed to determine if the projection is related to another projection in the transaction. The projection is committed if it is not related to another projection and delayed if related to another projection. Likewise, related projections are determined and aborted together if a transaction error occurs. The method allows recover to a consistent database state after projection abortion while preserving concurrency and availability during operation.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

As used in this disclosure the term "transaction" refers to a series of statements including reads, writes, and assignments that act on a database. An atomic data set (ADS) is a portion of a database which is partitioned into the smallest set of data in which consistency can be maintained. The database is broken up into ADSs based upon constraint definitions at the time the database is built. The term "projection" refers to a subsequence of statements from a particular transaction that access a particular ADS. A statement is in a particular projection if that statement from the transaction reads or writes data from or to the particular ADS. An assignment statement is not in any projection because it does not read or write data. A second statement is said to depend on a first statement if the second statement uses data that is defined in the first statement or in any intervening statements that are directly or indirectly dependent on data from the first statement.

EXAMPLE 1

Let T be a transaction with statements $S_0$, $S_1$, $S_2$, $S_3$, $S_4$, and $S_5$.

| | |
|---|---|
| $S_0$: $v_1 := r(x)$ | /*$S_0$ defines $v_1$ using data item x */ |
| $S_1$: $v_2 := r(y)$ | /*$S_1$ defines $v_2$ using data item y */ |
| $S_2$: $v_3 := f(v_1)$ | /*$S_2$ defines $v_3$ using $v_1$ */ |
| $S_3$: $v_4 := f(v_2)$ | /*$S_3$ defines $v_4$ using $v_2$ */ |
| $S_4$: $v_5 := f(v_4)$ | /*$S_4$ defines $v_5$ using $v_4$ */ |
| $S_5$: $w(y, v_4)$ | /*$S_5$ redefines data item y using $v_4$ */ |

$S_2$ directly depends on $S_0$ because $S_2$ uses $v_1$ from $S_0$ to define $v_3$. $S_3$ directly depends on $S_1$ because $S_3$ uses $v_2$ from $S_1$ to define $v_4$. $S_4$ directly depends on $S_3$ because $S_4$ uses $v_4$ from $S_3$ to define $v_5$, and $S_4$ depends on $S_1$ because $S_4$ uses $v_4$ from $S_3$, which was defined using $v_2$ defined in $S_1$. If x and y belong to distinct atomic data sets A and B respectively then $S_0$ is in a projection $\pi_A$ and $S_1$, $S_5$ are in a projection $\pi_B$.

Projections also exhibit dependency. If one statement in a first projection is dependent on data from a second projection then the first projection depends on the second projection. Projections are related if a dependency exists among two or more of them.

A depends-on graph can be constructed during transaction run time using the projections as nodes and the dependency relationships between projections as edges. When a projection begins, a node for that projection is inserted in the depends on graph. When the projection executes a read statement a definition lock is placed on the result memory variable of the read statement. Execution of an assignment statement causes no change to the depends on graph; however, its operation must be considered because assignment statements can have transitive effects. A write statement causes a use lock to be placed on the result memory variable of the statement. Placing a definition lock on a variable causes the system to generate an edge between the projection's node and other projection's nodes which hold either a use lock or a definition lock on the variable. Placement of a use lock on a variable causes the system to generate an edge between the projection placing the use lock and any other projections which hold definition locks on that variable.

When a projection requests commit, the system looks at the generated depends on graph. If any edges exist between the projection committing and another projection then the projections are related. Commit for the projection requesting commit must delay until all related projections have requested commit to ensure system consistency.

Figure 1:
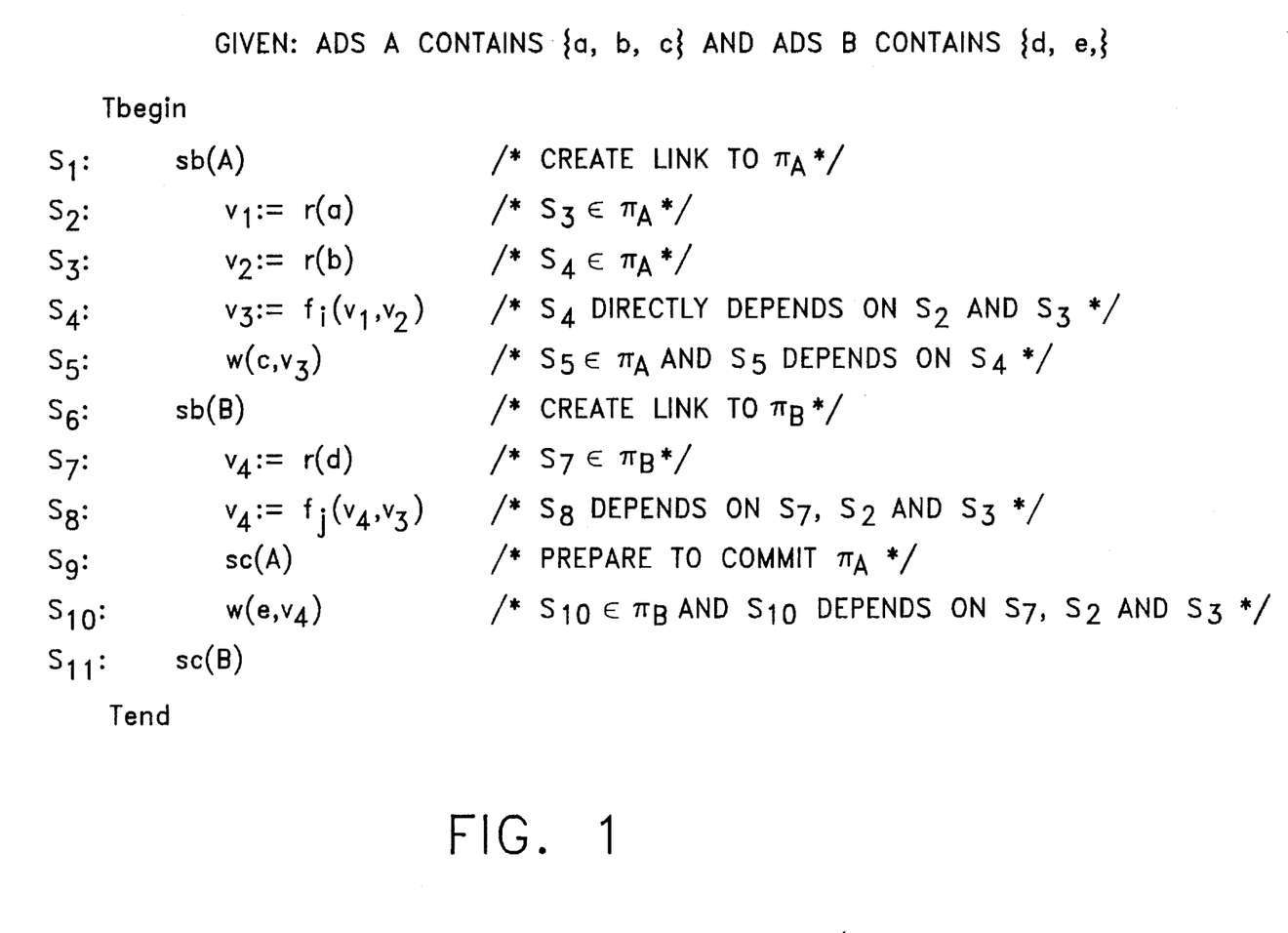
FIG. 1 shows pseudocode for an example transaction.

Referring now to FIG. 1 there is shown pseudocode for a transaction in which one projection depends on another projection. In this figure, "Tbegin" indicates the start of the transaction and "Tend" indicates the end of the transaction projection. Hereinafter, "Tbegin" and "Tend" are referred to collectively as transaction delimiting commands. Projection A is referred to using the symbol $\pi_A$, and projection B is referred to by $\pi_B$. The beginning of a projection is indicated by sb(X) where X is the particular projection. Likewise, the commit time for a projection is indicated by sc(X) where X is the particular projection. Collectively, the commands sb(X) and sc(X) are known as projection delimiting commands. The projection delimiting statements, sb(X) and sc(X), are coded by an applications programmer or applications programming system. The programmer places the statement sc(X) to assure that preceding data is properly updated but also available to other concurrent transactions at an early time. Reading a variable from a database is indicated by the function r(x) where x is the database variable being read. Writing a particular variable from a database is indicated by the command w(x,y) where x is the variable being written to and y is the memory variable being written to the database. Each statement of the transaction is indicated with the notation $S_x$ where x is the number of the statement. In this example, database variables are referred to by the letters a, b, c, d, and e. Memory variables are referred to by $v_x$ where x is a number. Symbolic comments are delimited by "/*" and "*/". The transaction preserves a record of committed projections, and the current program counter position in stable storage. This information allows the transaction to begin after the last completed projection on an error.

Figure 2A:
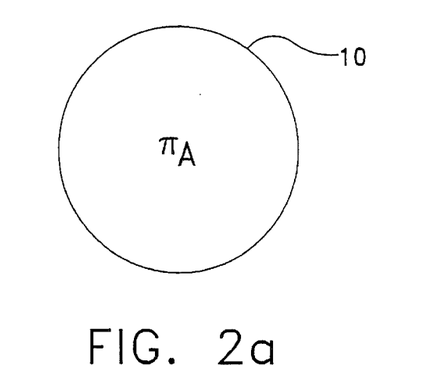
FIGS. 2a–2c show a steps in the creation of a depends on graph for the transaction of FIG. 1.
Figure 2B:
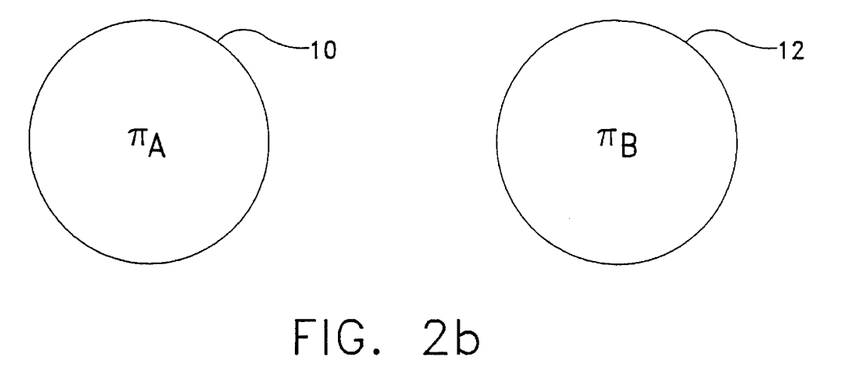
Figure 2C:
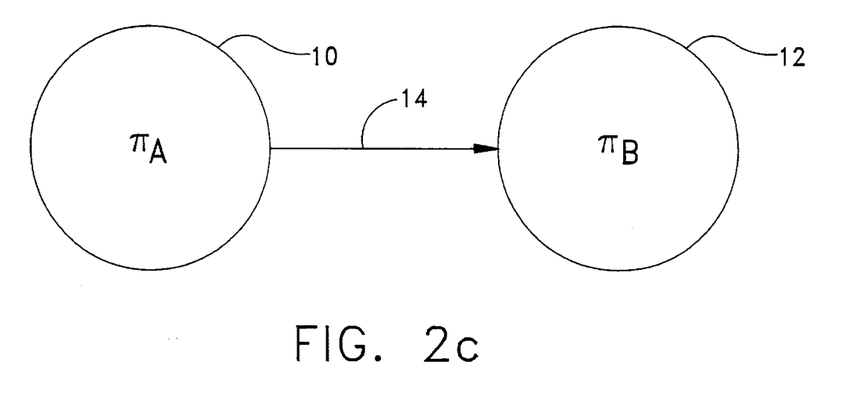

As the system executes the statements contained in FIG. 1, a depends on graph is created as shown in FIG. 2a–2c. In the transaction of FIG. 1, ADS A contains database variables a, b, and c, and ADS B contains database variables d and e. At $S_1$ projection A, $\pi_A$, is started, and a node 10 is created for $\pi_A$ in the depends on graph shown in FIG. 2a. $S_2$ reads a into memory variable $v_1$. This has no affect on the depends on graph because a is a variable from $\pi_A$ and $v_1$ has not been used or defined by another projection. Likewise, $S_3$–$S_5$ have no affect on the depends on graph because they have not been used or defined by another projection. $S_6$ starts projection $\pi_B$, and a new node 12 is inserted in the depends on graph as shown in FIG. 2b. $S_7$ reads d into memory variable $v_4$. This action has no affect on the depends on graph because $v_4$ has not been defined or used by another projection. $S_8$ causes an edge 14 to be inserted into the depends on graph between node $\pi_A$ 10 and node $\pi_B$ 12 because $v_4$ is reassigned using $v_3$ a variable which has been used in $\pi_A$. At $S_9$ projection $\pi_A$ requests commit. The system examines the depends on graph shown in FIG. 2c to determine if any other projections are related to $\pi_A$. The systems finds that $\pi_B$ is related to $\pi_A$ because edge 14 exists between node $\pi_A$ 10 and node $\pi_B$ 12; therefore, $\pi_A$ commit must be merged with $\pi_B$ commit. $S_{10}$ executes and has no affect on the graph. In $S_{11}$, projection $\pi_B$ requests commit, and the system determines that $\pi_B$ is dependent on $\pi_A$ and on no other projections. $\pi_A$ is allowed to commit then $\pi_B$ is allowed to commit. After a transaction commits, its node and related edges are removed from the depends on graph.

Figure 3:
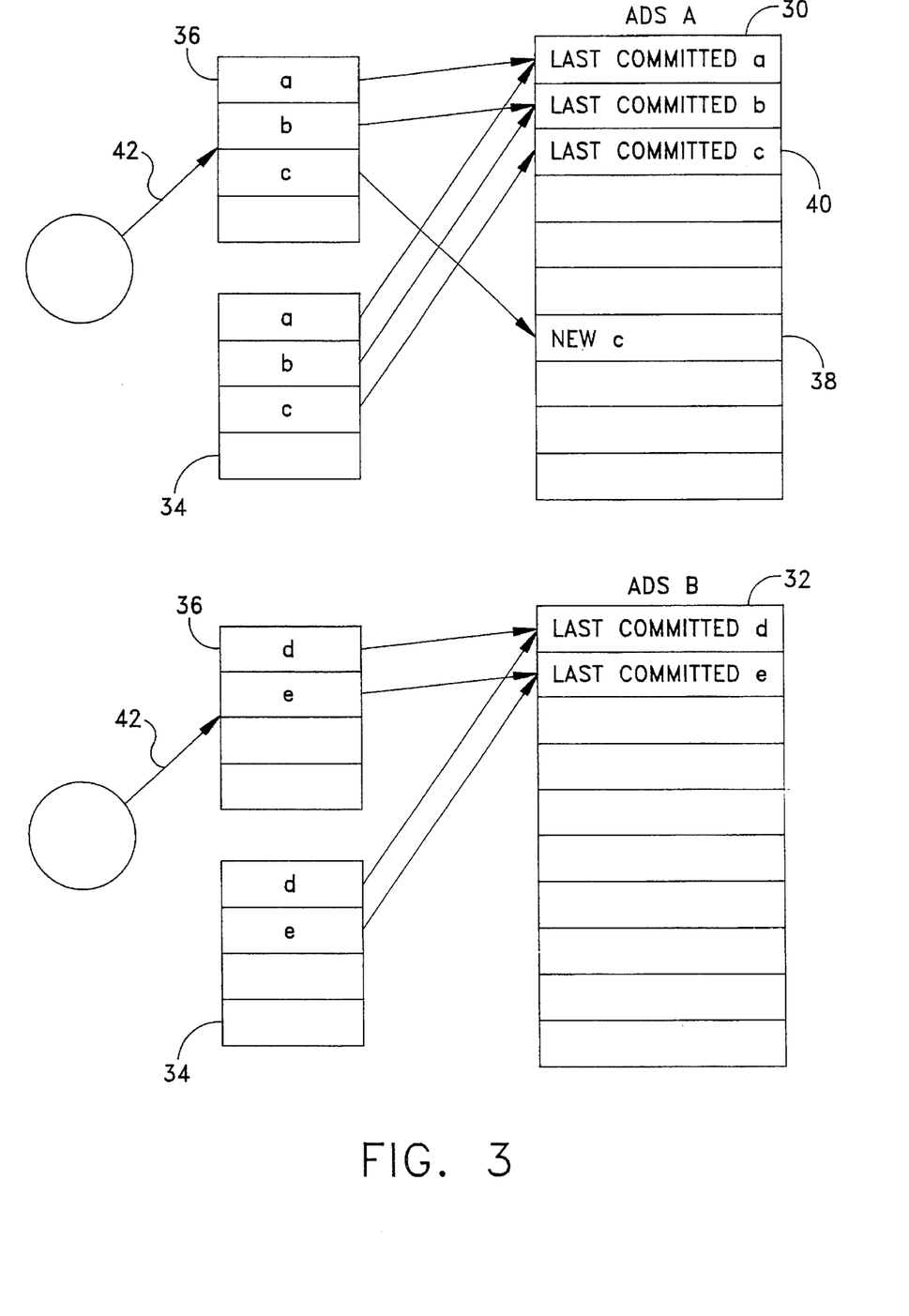
FIG. 3 shows an implementation of atomic data sets as used by the invention.

Referring now to FIG. 3, there is shown a diagram of a typical database for use with the merge-segment commit protocol of this invention. The database shown is the database of FIG. 1 after the execution of $S_7$. Two atomic data sets are shown as ADS A 30 and ADS B 32. These are representations of the stable data storage area that will not be affected by a transaction or system failure. While a projection is being executed, each subject ADS has two indexes, a main index 34 and a copy index 36. These two indexes provide a reference table give the system the location of each specific data item in the ADS. At the start of a projection the system allocates copy index area 34 and copies index information from main index 34 to copy index 36. The location of the main index is maintained by the system in stable storage. Both indexes, therefore, contain the same index information. While the projection is active, a write command to the ADS causes the system to write data items to a clear area of the ADS, and the system changes copy index 36 to refer to the newly written data. This is shown by example in FIG. 3 wherein a new value 38 has been written to data item c in ADS A 30. Copy index 36 for ADS A 30 points to the new value for data item c 38, and main index 34 continues to reference the previously committed value for c 40. Upon commit the system changes an index pointer 42 to refer to copy index 36 as the main index. Space formerly taken by main index 34 can be released. ADS B 32 shows a database wherein the data items have not been changed. In an alternative embodiment, index information could be copied from the copy index to the main index; however, the use of a pointer is more efficient in most applications. This database structure is known in the art, but is included herein for reference purposes.

Figure 4:
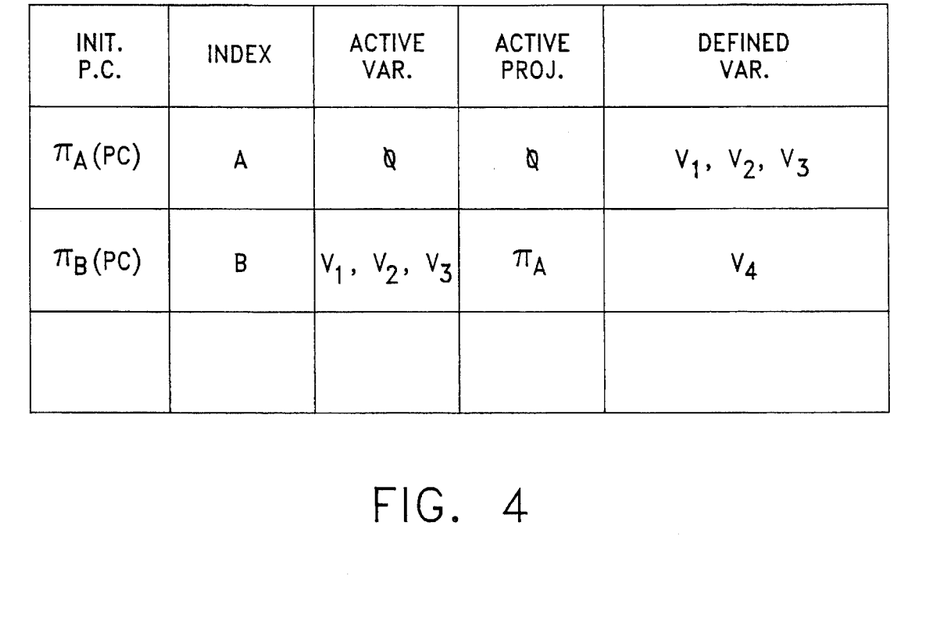
FIG. 4 shows an implementation of recovery block table used by the invention to recovery from errors.
Figure 5:
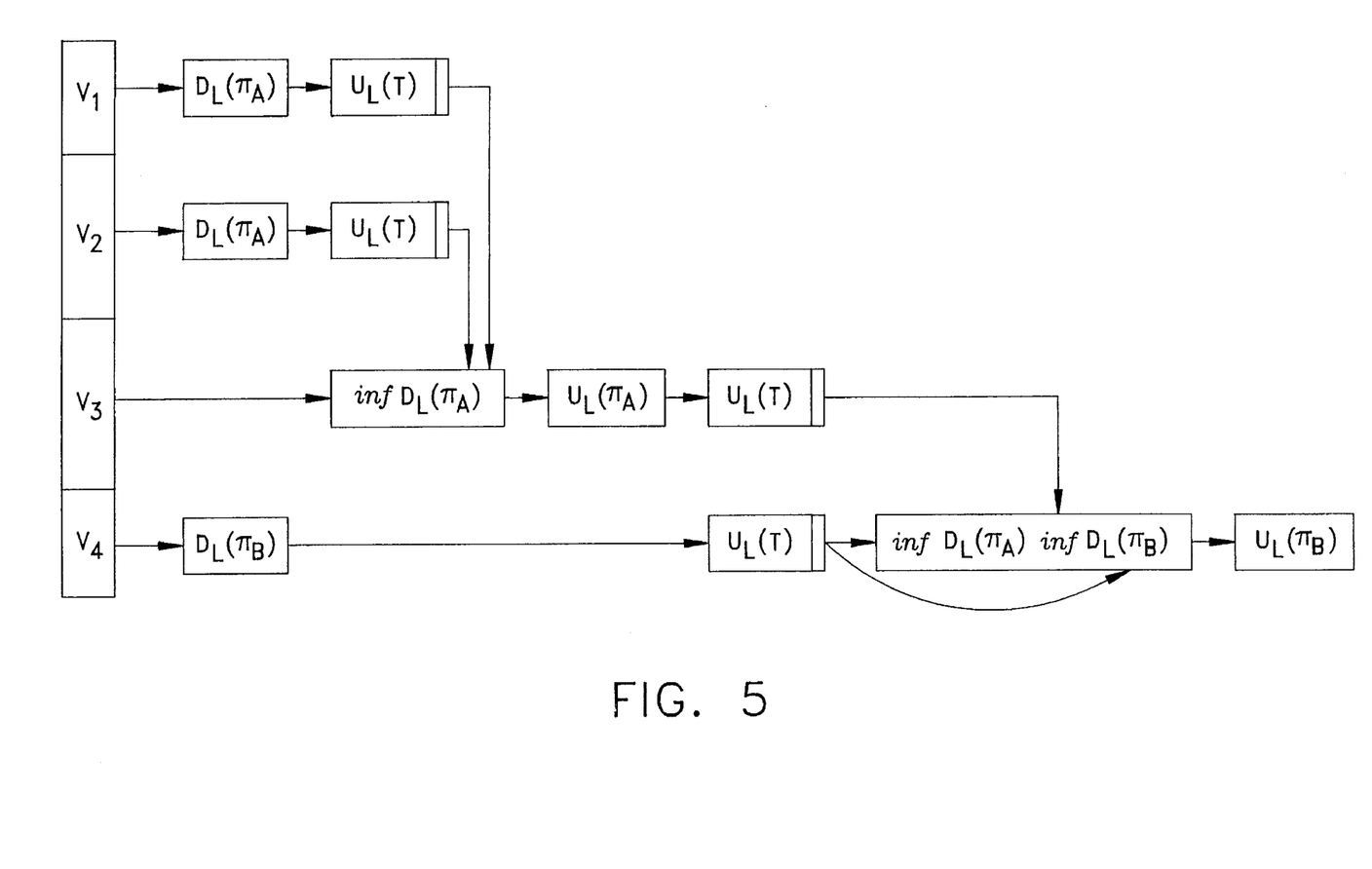
FIG. 5 shows an implementation of a variable lock table used by the invention to preserve database consistency and maintain the depends on graph.

A possible actual implementation for the database system is set forth in FIG. 4 and FIG. 5. Upon start of a transaction, the system allocates a recovery block table as shown in FIG. 4. When a projection begins as in $S_1$ of FIG. 1 a recovery block 40 is created with the program counter for the projection, $\pi_A(pc)$ 42; the location of the projection's main index 44; the location of active variables at the start of the projection 46; and other projections which are active at the projection start 48.

When a transaction is first started the system also allocates a variable lock table for that transaction as in FIG. 5. Lock tables are well known in the database art to avoid referencing data that is currently in use. For example, if one transaction reads data that a first transaction is in the process of updating, the data read is most likely going to be in error until the first transaction has completed its update. Lock tables provide a means for keeping data from being read while it is being updated. In the inventive database system, the lock table for a particular transaction is preserved only for the duration of that transaction. Locks stored in the lock table identify the projection or transaction entity obtaining the lock, the type of lock being obtained, and point to related locks, if any. When a lock is placed on a variable, the lock contains at least one pointer referring to previous locks placed on that variable and related locks placed on other variables. Lock tables are typically implemented in computer software by flags and a linked list of pointers, although other well known methods can be used.

In the variable lock table of this invention, three types of locks can be placed on a variable. A use lock is placed on a variable when the variable is assigned. The symbolic syntax used herein for a use lock is $U_L(X)$ where X is the transaction or projection acquiring the use lock. A definition lock is placed on a variable when that variable is defined. The syntax for a definition lock is $D_L(X)$ where X is the projection acquiring the definition lock. A third type of lock, the inferred definition lock, is to allow the system to find possible definition conflicts without conducting a complete search of the lock table. For example, if a variable I is defined by a function of a variable J which was read from ADS X, the inferred definition lock should refer to ADS X. An inferred definition lock is indicated by the symbol inf $D_L(last(v))$ where lastly) is used to indicate the identifier for the last projection having a lock on variable v. To evaluate last(v) the system references the lock table for the specified variable v, and determines which projection last locked the variable. If locks were placed on the variable by multiple projections during the last operation on that variable, then last(v) will be result in multiple references. Inferred definition locks are created during assignment statements. When an assignment statement executes, the transaction acquires use locks, $U_L(T)$, on the arguments of the assignment. The last projection used by the result variable and the last projections used by the argument variables acquire inferred definition locks, inf $D_L(last(v))$, on the result variable. Links are added from the use locks to the inferred definition locks set by the system on the arguments. These links allow the system to trace an assignment back to previous variables to determine if a dependency is caused by transitivity.

A read statement, $v_1:=r(a)$, such as $S_2$ in FIG. 1 causes the following lock table actions. The system inserts $v_1$'s identifier in the lock table if $v_1$ is not already in the lock table. Variable $v_1$ has a definition lock, $D_L(\pi_A)$ placed on it from projection $\pi_A$ because data is being read from that projection.

An assignment statement, $v_3:=f_i(v_1,v_2)$ in $S_4$, causes the system to insert $v_3$'s identifier in the lock table if it is not already there. The transaction, T, acquires use locks, $U_L(T)$, on each of the arguments of the assignment, $v_1$ and $v_2$. The system attempts to establish inferred definition locks, inf $D_L(last(v_1))$, inf $D_L(last(v_2))$, and inf $D_L(last(v_3))$. Evaluation of the $last(v_1)$ function results in an inferred definition lock, inf $D_L(\pi_A)$, being placed on $v_3$. Because evaluation of $last(v_2)$ also gives $\pi_A$, the same projection as the first argument, another inf $D_L(\pi_A)$ is not placed on $v_3$. When evaluated $last(v_3)$ is a null because $v_3$ is a newly defined variable with no prior locks. An inferred definition lock does not need to be placed on the result variable of the assignment if the result variable is the same as one of the arguments, the result variable is being initially defined in the assignment, or the inferred definition lock would merely repeat a previous lock. After establishing locks on the affected variables, the system adds links to the variable lock table from the inferred definition locks back to the source use locks. One link will be from inf $D_L(\pi_A)$ on $v_3$ back to $U_L(T)$ on $v_1$. Another link will be established from inf $D_L(\pi_A)$ on $v_3$ back to $U_L(T)$ on $v_2$.

A write statement, $w(c,v_3)$, such as $S_5$ in FIG. 1 causes the system to insert $v_3$'s identifier in the lock table if it is not already there. The system places a use lock, $U_L(\pi_A)$, on $v_3$ in the lock table.

A projection $\pi$'s subbegin statement, $sb(\pi)$, such as $S_1$ in FIG. 1 causes the system to build a copy index for projection $\pi$ by copying index information from the main index to another location. See FIG. 2. The system also creates a recovery block for projection $\pi$. The recovery block contains the program counter for the projection, the location of the projection's copy index, active variables at the start of the projection, other projections which are active at the projection $\pi$'s start, and variables defined in the course of the projection.

A read statement for a projection $\pi$ causes the system to append the variable to the defined variables section of projection $\pi$'s recovery block. The defined variables section of the recovery block provides additional cross referencing between the recovery block and the lock table to speed the system. Write statements for a variable also append the variable to projection $\pi$'s recovery block, if not already present there. Assignment statements do not have any affect on the recovery block because assignments do not affect the static store.

A projection $\pi$'s subcommit statement, sc($\pi$), such as $S_9$ in FIG. 1 causes the system to determine if projection $\pi$ can commit without corrupting the database. Projections commit in the order that their subcommit commands arrive at the system scheduler. Projection $\pi$ must delay commit if projection $\pi$ depends on data from another projection or if another projection in the transaction is dependent on projection $\pi$.

In order to determine if projection $\pi$ can commit, the system examines the last lock on each variable defined by the committing projection. If the last lock was placed by another projection then the projection cannot commit until the locking projection requests commit. To preserve the commit order, the scheduler records the order of commit requests. When the scheduler receives a commit request from the dependent projection, the system analyzes the dependencies for the dependent projection. If the system determines that the dependent projection can commit but for the original projection then the original projection is allowed to commit.

If the latest lock was not placed by another projection, the system examines all links to the current lock to determine if related locks are placed by another projection. The system then examines earlier locks on the variable and traces links back to all related variables. If no locks are held on any of the defined variables by other projections then the system will allow the current projection to commit. The system delays projection commit when the projection is dependent upon another projection or when another projection is dependent upon it. The first projection is allowed to commit immediately before any sibling projection.

On commit, locks held by the committing projection are released, the copy index is made the main index, and the recovery block can be removed. A commit notice for the projection is placed in the transaction's commit list.

When a projection is aborted because of a transaction error, the aborted transaction must first be examined to determine if any other projections depend on the aborted projection directly or indirectly. All currently dependent projections must be aborted with the originally aborted projection to insure database integrity. The system determines dependencies by examining the inferred definition locks held on the variables defined in the current projection. If a variable has an inferred definition lock placed on it that refers back to another projection or use-definition links which trace back to another projection then the projection is dependent on the other projection.

When only one projection is aborted, that projection can be restarted without loss of serializability because no other projections depend on that projection. To restart the projection the program counter is reset to the value it contained at the start of the projection, and the main index is copied to the copy index. The projection then executes as initially.

To restart projections which have been merged, both projections recovery blocks are used. The program counters, active variables, and active projections during the current transaction are retrieved. Recovery begins at the recovered program counter address of the earliest projection using the original data values upon the start of the projection from the original main index. New copy indexes are created for all projections involved. Execution follows as in the initial code execution.

When the transaction ends, the system can commit all outstanding projections in the order received. Locks held by the transaction are released. The system deallocates the lock table and recovery block table.

Operation of the recovery block table of FIG. 4 and the variable lock table of FIG. 5 shall now be explained with reference to the example transaction of FIG. 1. On receipt of the Tbegin statement, stable storage space is allocated for the variable lock table and the recovery block table. The subbegin command of $S_1$ causes insertion of projection A's program counter in the recovery block table. The main index of ADS A is copied to the copy index. All currently active variables and projections are inserted into the recovery block table. The defined variables section of the recovery block table will initially be empty. In $S_2$, execution of a read command from database variable a to memory variable $v_1$ causes the system to record v1 in the recovery block table and then in the variable lock table apply a definition lock to $v_1$ held by $\pi_A$. Likewise in $S_3$, $v_2$ is recorded and a definition lock is applied to $v_2$ which is held by $\pi_A$.

An assignment command, $v_3:=f_i(v_1,v_2)$ is executed in $S_4$, assigning the result of $f(v_1, v_2)$ to $v_3$. The system inserts $v_3$'s identifier in the lock table and the recovery block table. The transaction, T, acquires use locks, $U_L(T)$, in the lock table on each of the arguments of the assignment, $v_1$ and $v_2$. The system attempts to establish inferred definition locks, inf $D_L(last(v_1))$, inf $D_L(last(v_2))$, and inf $D_L(last(v_3))$. Evaluation of the last($v_1$) function results in an inferred definition lock, inf $D_L(\pi_A)$, being placed on $v_3$. Because evaluation of last($v_2$) also gives $\pi_A$, the same projection as the first argument, another inf $D_L(\pi_A)$ is not placed on $v_3$. When evaluated last($v_3$) is a null because $v_3$ is a newly defined variable not present in the recovery block table. An inferred definition lock does not need to be placed on the result variable of the assignment if the result variable is the same as one of the arguments, the result variable is being initially defined in the assignment, or the inferred definition lock would merely repeat a previous lock. After establishing locks on the affected variables, the system adds links to the variable lock table from the inferred definition locks back to the source use locks. These links are identified in FIG. 5 by the arrows pointing from the use locks $U_L(T)$ on $v_1$ and $v_2$ to inf $D_L(\pi_A)$ on $v_3$.

$S_5$ executes a write command to write memory variable $v_3$ to database variable c. On receipt of this command, the system puts the location of $v_3$ in the recovery lock table because the $v_3$ location is not currently there. A use lock, $U_L(\pi_A)$, is inserted for $v_3$ in the lock table.

Projection B is started by the subbegin command, sb(B), of $S_6$. As in the $S_1$ subbegin command the projection's program counter is inserted in the recovery block table, and the main index of ADS B is copied to the copy index. Currently active variables, $v_1$, $v_2$ and $v_3$, and projection, $\pi_A$, are inserted into the recovery block table. Initially, the defined variables section of the recovery block table is empty. $S_7$ executes a read command reading d into $v_4$. The location of $v_4$ is written to the defined variables section of the recovery block table and to the variable lock table. A definition lock, $D_L(\pi_B)$, is placed on $v_4$ because $v_4$ is defined by $\pi_B$. $S_8$ assigns the result of a function of $v_4$ and $v_3$ to $v_4$. This has no effect on the recovery block table because $v_4$ is already identified. In the lock table use locks, $U_L(T)$, are placed on the arguments of the function, $v_3$ and $v_4$. Inferred definition locks, inf $D_L(\pi_A)$ and inf $D_L(\pi_B)$, are placed on $v_4$ after evaluation of last ($v_3$) and last ($v_4$). A pointer is created between the use lock on $v_3$ and the inferred definition lock, inf $D_L(\pi_A)$, on $v_4$. A pointer is also created between the use lock on $v_4$ and the inferred definition lock, inf $D_L(\pi_B)$, on $v_4$.

The embodiment above uses a hierarchical lock table which allows the order of locking on each variable v to be determined. It is envisioned, however, that a non-hierarchical lock table would be effective for the purposes of this invention. The hierarchical lock table is preferred because it offers optimization in locating conflicts between projection.

A subcommit command for projection A is issued in $S_9$. The system must evaluate the lock table to determine if projection A is related to any other projections. To do this, the system must search the lock table for all variables defined by projection A. Starting with $v_1$, the system analyzes the last lock on $v_1$. Since this lock is a use lock, $U_L(T)$, held by the transaction, no conflicts are created. The system then follows the pointer from the use lock to the inferred definition lock, inf $D_L(\pi_A)$, held by projection A on $v_3$. No conflicts are created by this lock because it is held by $\pi_A$, the projection that is currently attempting to commit. $U_L(\pi_A)$ on $v_3$ creates no conflicts for the same reason. $U_L(T)$ on $v_3$ only locks against other transactions, and, therefore, does not create any conflicts. The system follows the pointer from $U_L(T)$ to the inferred definition lock, inf $D_L(\pi_A)$. The system next encounters the inferred definition lock, inf $D_L(\pi_B)$, held by projection B on $v_4$. This indicates a use-definition conflict between projection A and projection B. Accordingly, commit for projection A must delay until projection B is ready to commit. If no conflict had been encountered, the system would have continued to analyze the backward path through the locks from $v_1$ to determine if any conflicts exist. After analyzing all paths from $v_1$, the system would proceed to analyze $v_2$ and $v_3$. Because commit for $\pi_A$ could not be accomplished, the projection's identifier is sent to the scheduler to indicate that the projection is ready to commit once $\pi_B$ issues a subcommit statement. Optionally, the system can continue to analyze the lock table to determine if the projection that failed commit is dependent on any other projections. This will allow the system to restart the failed commit only when all related projections are ready to commit. If the system does not continue to analyze the lock table, the system can determine whether the projection failing commit is ready to commit prior to commit of the known related projection and any subsequent projections.

Statement $S_{10}$ issues a write command to write $v_4$ to e. Since e is a projection B database variable, a use lock, $U_L(\pi_B)$, is placed on $v_4$.

In $S_{11}$ subcommit command, sc(B) is issued for projection B. The system must determine if projection B is related to any other projections before projection B is allowed to commit. The system notes that projection A is related to projection B from the result of the sc(A) command issued in $S_6$. The system also determines that no other projections are active; therefore, projection A is allowed to commit because it requested commit before projection B. On commit, the ADS A copy index becomes the new ADS A main index, all locks held by projection A are released, and the projection A recovery block table entry is deallocated. Projection A's identifier is written to the transaction's commit list. Likewise, when projection B commits the ADS B copy index becomes the new ADS B main index, all locks held are released, the recovery block table entry is deallocated, and projection B's identifier is placed on the transaction's commit list.

When the system receives the transaction end command, Tend, it releases all locks, deallocates the lock table, and deallocates the recovery block table.

What has thus been described is a merge, commit, recovery protocol for real-time database management systems. The protocol allows greater access to data by maintaining locking over atomic data sets and projections rather than by transactions as in the prior art.

Obviously many modifications and variations of the present invention may become apparent in light of the above teachings. In light of the above, it is therefore understood that within the scope of the appended claims, the invention may be practiced otherwise than as specifically described.

What is claimed is:

1. A computer database method comprising the steps of:

organizing data into atomic data sets;

breaking down transactions containing a plurality of statements operating on said data into projections having statements which operate on only one said atomic data set;

executing statements from one said projection, said statements comprising read commands, write commands, assignment commands, transaction delimiting commands, and projection delimiting commands;

generating a depends on graph during execution of said statements;

storing projection recovery data during execution of said statements;

analyzing said depends on graph upon receipt of a projection commit command to determine if said projection is related to at least one other projection;

committing said projection if said analyzed projection is separate from said other projections;

delaying commit of said analyzed projection until the receipt of a projection commit command of said related projection if said projection is related to another projection;

analyzing said depends on graph if a transaction error is encountered to determine if a currently active projection is related to another projection;

aborting said currently active projection upon a transaction error;

aborting said related projections to said currently active projection if any, after encountering a transaction error; and recovering from said aborted projection to a consistent database state.

2. The method of claim 1 wherein the step of generating a depends on graph comprises the steps of:

allocating a variable lock table after starting a transaction;

identifying a variable in said lock table on initial use of said variable by a statement;

inserting a definition lock linked to said identified variable in said lock table, said definition lock being held by the command issuing projection upon execution of a read command;

inserting a use lock linked to an identified variable used in the argument of an assignment command, said definition lock being held by the transaction;

inserting a use lock linked to an identified variable used as the data source of a write command, said definition lock being held by the projection identified with the written to data set;

inserting an inferred definition lock linked to an identified variable used as the result variable of an assignment command, said inferred definition lock being held by the last at least one projection locking said result variable or said argument variables of said assignment command; and generating pointers from said use locks inserted by said assignment command to said inferred definition locks inserted by said assignment command.

3. The method of claim 2 wherein the step of analyzing said depends on graph comprises the steps of:

referencing sequentially each said identified variable of said projection for which said commit command has been received in said variable lock table; and determining if said definition locks, inferred definition locks, use locks, and pointers indicate that said projection is related to another projection.

4. The method of claim 2 wherein said use locks, definition locks, and inferred definition locks are inserted in said lock table in a hierarchical fashion indicating lock placement order for each said variable.

5. The method of claim 4 wherein the step of analyzing said depends on graph comprises the steps of:

referencing each said identified variable of said projection for which said commit command has been received in said variable lock table sequentially;

checking said lock placed on said variable latest in time first;

checking said locks pointed to by said pointers and any locks placed on said pointed to lock variable later in time;

checking said locks placed earlier in time; and continuing checking said locks until all locks in said hierarchic chain have been checked.

* * * * *